United States Patent
Greef et al.

[11] Patent Number: 6,125,364
[45] Date of Patent: Sep. 26, 2000

[54] FLEXIBLE OBJECT PERSISTENCE FRAMEWORK USING DATA CURSOR OBJECTS LOADED FROM SUPERCLASSES

[75] Inventors: Arthur Reginald Greef, Seattle, Wash.; Thomas Robert Maguire, Brewster; Frank Castellucci, Amawalk, both of N.Y.

[73] Assignee: International Business Machines Corporation, Armonk, N.Y.

[21] Appl. No.: 08/964,097

[22] Filed: Nov. 6, 1997

[51] Int. Cl.⁷ .............................. G06F 17/30; G06F 7/00
[52] U.S. Cl. ............................................ 707/103; 707/100
[58] Field of Search ........................... 707/103, 10, 100; 395/614, 333

[56] References Cited

U.S. PATENT DOCUMENTS

| | | | |
|---|---|---|---|
| 5,202,981 | 4/1993 | Shackelford | 395/600 |
| 5,247,669 | 9/1993 | Abraham et al. | 395/600 |
| 5,414,812 | 5/1995 | Filip et al. | 707/103 |
| 5,560,005 | 9/1996 | Hoover et al. | 395/600 |
| 5,692,183 | 11/1997 | Hapner et al. | 295/614 |
| 5,710,896 | 1/1998 | Seidl | 395/333 |
| 5,727,203 | 3/1998 | Hapner et al. | 395/614 |
| 5,752,245 | 5/1998 | Parrish et al. | 707/10 |
| 5,765,162 | 6/1998 | Blackman et al. | 707/103 |
| 5,768,511 | 6/1998 | Galvin et al. | 395/200.33 |
| 5,787,431 | 7/1998 | Shaughnessy | 707/100 |
| 5,809,507 | 9/1998 | Cavanaugh, III | 707/103 |
| 5,829,053 | 10/1998 | Smith et al. | 711/202 |
| 5,848,419 | 12/1998 | Hapner et al. | 707/103 |

FOREIGN PATENT DOCUMENTS

| | | | |
|---|---|---|---|
| 0603880A2 | 6/1994 | European Pat. Off. | G06F 9/44 |
| 359085538A | 5/1984 | Japan | G06F 7/28 |

OTHER PUBLICATIONS

Mannino et al, "An Overview of the Object–Oriented Functional Data Language", IEEE 1989.

Booch, G., Object–Oriented Analysis and Design with Applications, 2nd ed. Benjamin Pub. 1994.

*Primary Examiner*—Thomas G. Black
*Assistant Examiner*—Uyen Le
*Attorney, Agent, or Firm*—Steven J. Meyers

[57] ABSTRACT

This system involves an object persistence framework for an object-oriented program which provides a persistent class, data storage class and a data cursor class, that permits specialized implementations of object storage and retrieval with heterogeneous permanent storage systems.

9 Claims, 8 Drawing Sheets

Schematic for a object-oriented persistence system

| Data for class 1 | data |
|---|---|
| Data for class 2 | data |
| ...... | ...... |
| Number of classes | Dword |
| Class 1 Offset | Dword |
| Class 1 Id | Dword |
| Class 2 Offset | Dword |
| Class 2 Id | Dword |
| ...... | ...... |
| Address of count field | Dword |

Nonvolatile object storage format

FLEXIBLE OBJECT PERSISTENCE FRAMEWORK USING DATA CURSOR OBJECTS LOADED FROM SUPERCLASSES

REFERENCE TO CO-PENDING PATENT APPLICATION

Reference is made to a co-pending patent application Ser. No. 08/964,096, METHOD FOR MIGRATING PERSISTENT OBJECTS WHEN THEIR CLASS DECLARATIONS ARE MODIFIED Arthur R. Greef et al., and assigned to a common assignee, Filed on Nov. 6, 1997.

BACKGROUND INFORMATION

1. Field of Invention

This system involves an object persistence framework for an object-oriented program, which provides a persistent class, data storage class, a data cursor class that permits class bindery, that permits specialized implementations of object storage and retrieval with heterogeneous permanent storage systems.

2. Background Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of new software systems. Object oriented programming uses a tool kit of system objects that can be assembled to perform a final task. Each object has certain data attributes and processes or methods that operate on the data. Data is said to be "encapsulated" by an object and can only be modified by the object methods. Methods are invoked by sending a message to an object identifying the method and supplying any needed arguments.

Object oriented systems have two important properties in addition to encapsulation. "Inheritance" is the ability to derive a new object from an existing object and inherit all properties, including, methods and data structure, from the existing object. The new object may have certain unique features which are supplied as overrides or modifications to the existing class. For example, a new subclass needs to specify only the functions and the data that distinguish that class from the existing more general class.

The ability to override an existing method description is termed polymorphism because a single message to an object can be processed in different ways depending on the object itself. Inheritance and polymorphism create a powerful structure for implementing new software systems. The software developer does not have to develop each piece of a system, they need only specify the unique features of the system.

The power of object oriented systems is realized through the development of system "Frameworks". A Framework is a collection of base classes that can be used by a system implementor to create a final systems product. The Framework is defined and developed to work as part of an associative system. Conceptually, the Framework is much like a set of standard hardware components used by computer hardware builders. Each of the components has certain defined functions and interfaces and the engineer assembles these components according to a particular design to create a unique hardware system.

Objects created by a data processing system are typically maintained in volatile memory of those systems. This allows faster processing, but does not provide a means to tore data. Object oriented systems solve this problem by implementing "persistent objects".

Regarding the term "persistence", is defined as follows. In Object-Oriented-Programming, the permanence of an object, particularly relevant in the context of object-oriented databases, which maintains a distinction between objects created only for the duration of execution and those intended for permanent storage. Thus persistence means that the object's state can be preserved beyond the termination of the process that created the object. The persistent framework includes methods that allow persistent objects to be stored in and retrieved from a non-volatile medium such as a hard disk drive or a writable optical-disk. Objects can be stored individually or grouped with other objects.

The literature defines an "object-oriented" program as one that (1) uses objects, not algorithms as its functional building blocks, (2) has each object being an instance of some class, and (3) has classes related to each other via inheritance relationships. An "object" comprises a data structure and a set of operations or set of methods, that can access and manipulate data. A "Class" is an abstract representation of an object and can be seen as a template for an object. An executing software program creates instances of these Classes called objects. Classes can be interrelated via an inheritance relationship to facilitate class data and operation reuse.

For example, we can create an abstract class termed "employee" that comprises the data and operations common to all employees. We can then create more specific employee classes called "Full-Time" and "Part-Time" to represent two specific employees. The "Full-Time" and "Part-Time" classes which have inheritance relationships with the Employee Class, will inherit the common data and operations from the abstract Employee Class. Interrelated classes form a class hierarchy whose topmost class is termed the "Root". Abstract classes are super-classes of more specific derived classes. Derived classes are subclasses of more abstract classes. A single inheritance class hierarchy is a hierarchy in which "each class" in the hierarchy can have no more than one parent. Whereas a multiple inheritance hierarchy is a hierarchy in which each class in the hierarchy can have more than one parent.

When an object-oriented program executes, it creates objects as specified by a program. These objects are created in temporary memory. The memory is termed temporary as the contents of this memory are lost whenever the program terminates. If a program needs to have objects persist even when the computer program terminates, then the program needs to store the created objects out to permanent storage, typically on a hard drive. This is usually performed by creating a persistence class that declares the data and operations necessary for writing and reading (their data members) to and from permanent memory. All objects that need to be stored persistently must be instances of a class that has either a direct or transitive inheritance relationship with this persistence class.

The persistence class has at least two virtual operations declared that are implemented by all derived classes. One operation writes each of the object's class data members out to a buffer and the other operation reads data from a buffer and initializes an object's class data members. The write operation usually begins at the top of the object's class hierarchy, writes out the class identifier (usually some number) and then writes out the data members to a buffer. When this is done, control is passed to a subclass in the class hierarchy and the same write operation is performed for that class. This is continued until there are no more subclasses in the class hierarchy. The contents of the buffer are then written to permanent storage. This process is reversed when recreating, the object from permanent storage. A buffer is filled with data, the first field of which is a class identifier. This is used to create an object of the specified class. Control is then passed to the virtual read operation of the topmost class in the class hierarchy. This operation reads data from the buffer and initializes the data members. Control is then passed to the subclass and the process is repeated all the way down the class hierarchy.

There are two problems with the method of using a persistence data base class with storage and retrieval methods.

1. The first problem is that the retrieval method cannot load constant member data and cannot load reference data as this information must be supplied to the object at creation time.

2. The second problem is using alternate permanent storage systems, e.g. file system, rational data base systems and Lotus Notes (TM) for object storage and retrieval, which is tightly linked with the implementation of the object. This yields an inflexible system that cannot have "plug and play persistence."

"Plug and Play" can be described as or defined as, a set specifications that allows a PC to configure itself automatically to work with peripherals (i.e. monitors, modems, printers) whereby the user can plug in peripherals and play without manually configuring the system. Plug and play PCs require a BIOS that supports Plug and Play and a expansion card.

SUMMARY OF INVENTION

The instant invention provides for a much more flexible approach that can accommodate both problems 1 & 2 listed above. This is achieved with an object persistence framework for an object-oriented programs that provides an entity persistent class, a data storage class, a data cursor class that permits class bindery, that permits specialized implementations of object storage and retrieval with heterogeneous permanent storage systems.

DESCRIPTION OF THE INVENTION

Overview

The solution to the problems noted above, as defined by the instant invention consists of two parts; an Object Management Framework and a Persistence Management Framework. The Object Management framework uses an object factory design pattern derived from the object factory design pattern in the Design Patterns book by Gamma et. al., (1995), page 107. The Object Management Framework is domain specific and not an object of this invention. The object of this invention, rather, is the Persistence Management Framework.

The Persistence Object Management Framework consists of five parts: the Entity Cache, the Entity Class, the Entity Smart Pointer, the Data Store and the data Cursor.

Figure 1:
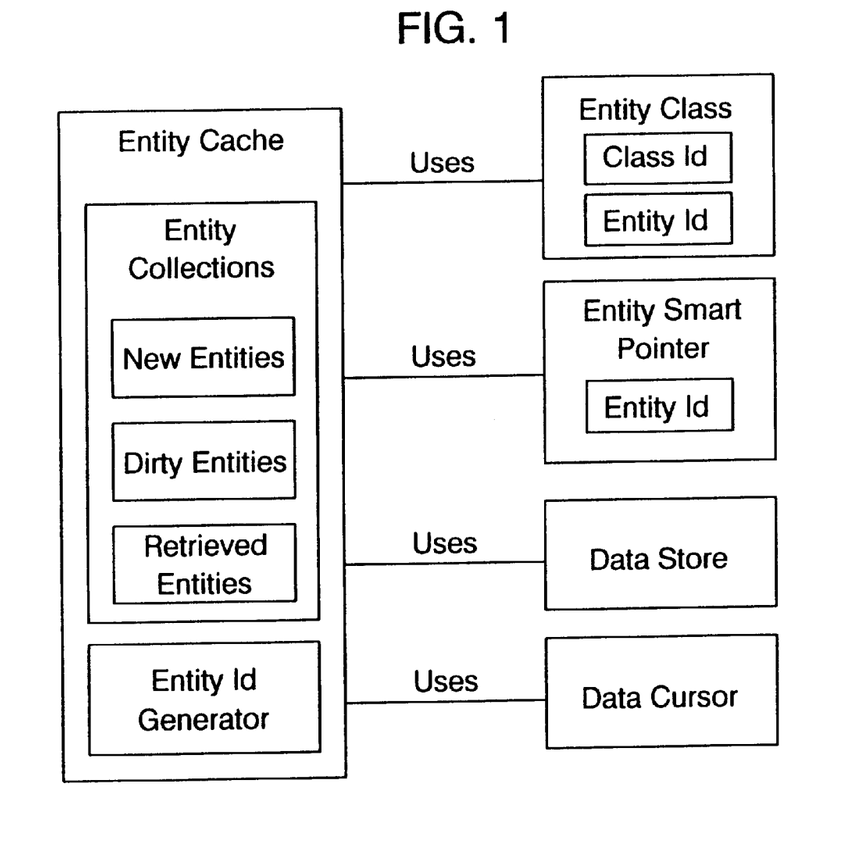
FIG. 1 Is an example of an Object Management Framework.

These relevant classes are shown in FIG. 1.

The Entity Cache comprises collections of "smart pointers" that have been created during a session. FIG. 1 shows the Entity Cache comprising a collection of new entities, a collection of dirty entities and a collection of retrieved entities. Each entity in the system has a unique object identifier and a class identifier as shown in the Entity Class depicted in FIG. 1. The unique object identifier is generated by the Entity ID Generator shown in FIG. 1. When the object is referenced with the entity identifier, the entity cache swivels the identifier to a smart pointer. If a smart pointer already exists in the entity cache, it returns the smart pointer. If the smart pointer does not exist in the entity cache, the object is loaded from the nonvolatile memory and the smart pointer is returned to the entity in the entity cache. All persistent objects have an entity identifier.

All entity object management is done with smart pointers. "Smart Pointers" are used to handle large amounts of objects in limited memory resources. What is required is a light weight representation of an entity, as described as light weight objects in Gamma et. al. (1995). Each entity has a corresponding smart pointer. It is a sub for a real object in memory. It it has no data members and it overloads the pointer and de-reference operators. All objects manipulate smart pointers. Objects have lists of smart pointers, not pointers to themselves.

Figure 2:
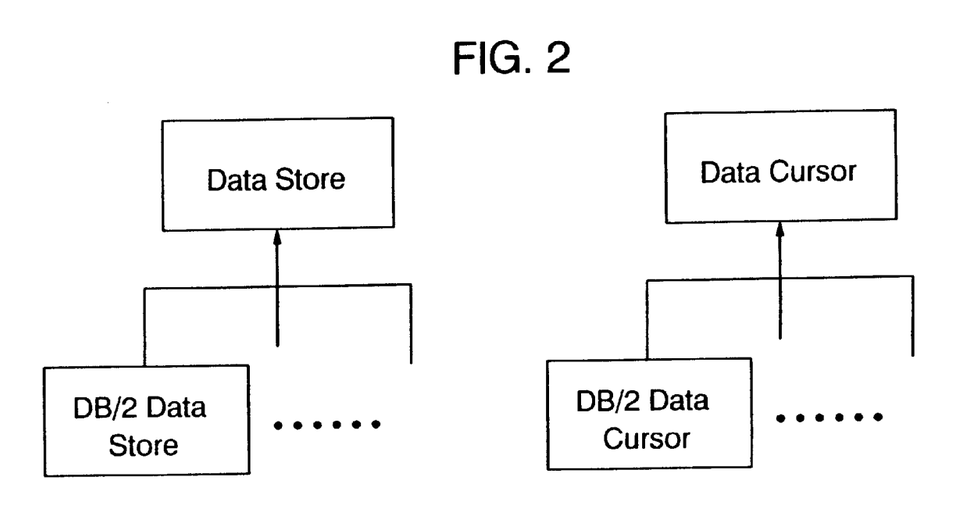
FIG. 2 The Data Cursor and Data Store Derivation Exemplar.

The two primary classes for streaming objects into and out of persistence is the Data Base Cursor and the Data Store shown with derived classes in FIG. 2. The data cursor is an abstraction for objects to get and put their members to and from persistence. If you modify an entity, it is marked dirty in the entity cache. The smart pointer is marked dirty and the data base will only save dirty entities. When you call save on an entity cache, the entity cache calls for a Data Cursor from the data store. For each dirty Smart Pointer, the Entity Cache calls the storer method with the Data Cursor as argument. Each object calls its parent storer method first. When an operation is invoked on a smart pointer, the object that it points to is faulted into the entity cache if it does not already exist. This is done by invoking an operation on the Data Store that can find an object in the nonvolatile memory when it is provided with the object's unique identifier. The Data Store returns a Data Cursor with the object's contents. A smart pointer is then created and the smart pointer asks the Class that corresponds to the object's class identifier, to create an object of that class.

Figure 3:
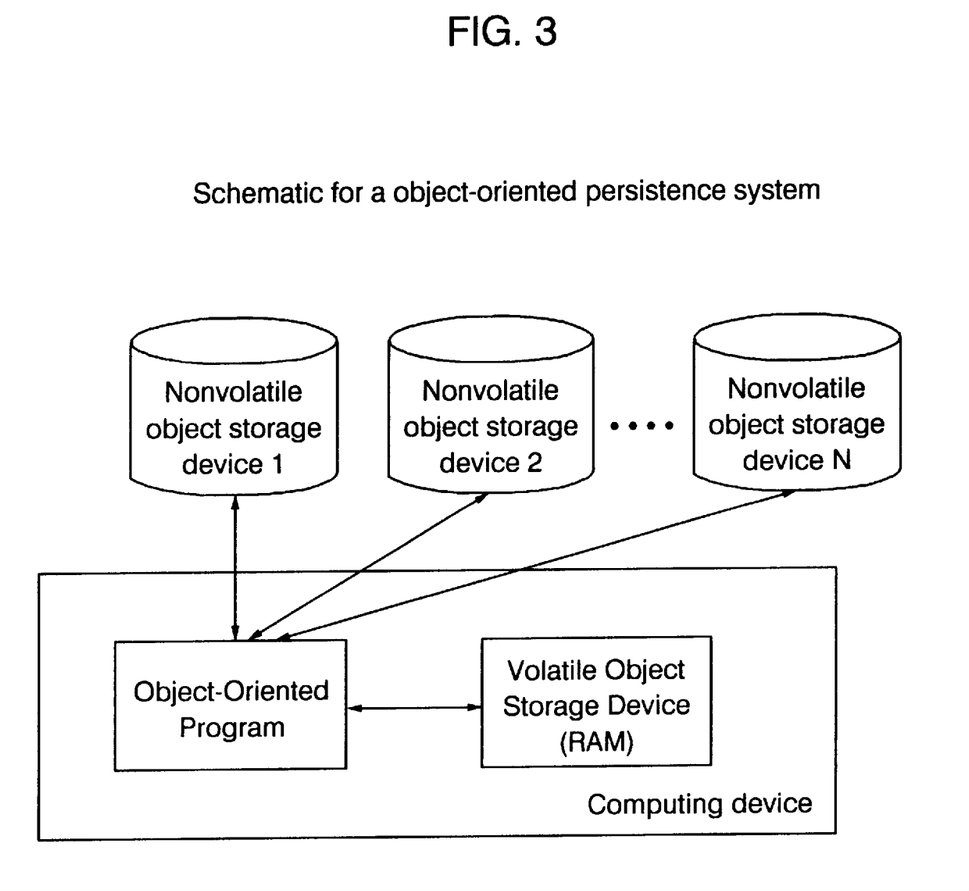
FIG. 3 Schematic for an Object-Oriented Persistence System.

The schematic for a system that provides a flexible object persistence framework for storing objects on heterogeneous permanent storage systems is shown in FIG. 3. An object oriented program needs to be able to store objects from a volatile store into a nonvolatile store called permanent or persistent store, and be able to reload objects from the nonvolatile store into the volatile store. The computing device must be flexible enough to facilitate the use of heterogeneous stores.

Figure 4:
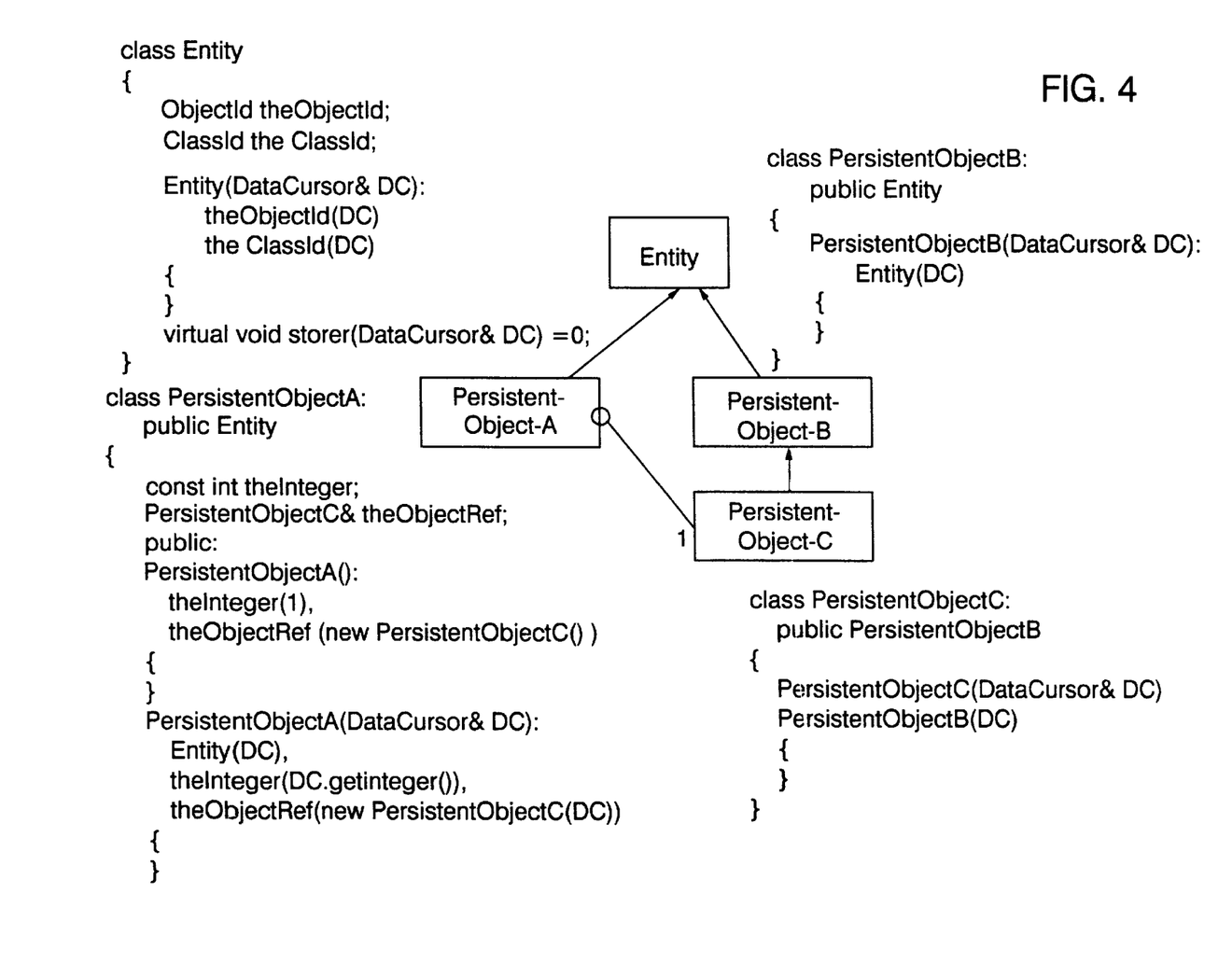
FIG. 4 A Nonvolatile Object Class Hierarchy Exemplar.

FIG. 4 shows an example class hierarchy for objects that are to be stored persistently. Each class must derive from a root class termed Entity class. The Entity has an object identifier, one pure virtual method (uses C++ example here) the storer method for storing the object out to nonvolatile memory, and a constructor method that takes a reference to a Data Cursor as its argument for creating the object in volatile memory.

There are three classes, Persistent-Object-A, Persistent-Object-B, and Persistent-Object-C. Persistent-Object-A has a reference to an instance of Persistent-Object-B. The arrows in the diagram denote inheritance in that Persistent-Object-A, and Persistent-Object-B inherit from Entity class and Persistent-Object-C inherits from the Persistent-Object-B class. The user relationship is shown as a link with a circle on the containing class. Persistent-Object-A also has another constant (const) member variable of type integer. Note that in C++ both constant and reference members must be initialized in the constructor of the class. They cannot be given values at any other time. This makes the use of prior inventions that provide a reader method on the Entity class unable to create these types of objects as constant and reference members must be provided when the object is created.

Figure 5:
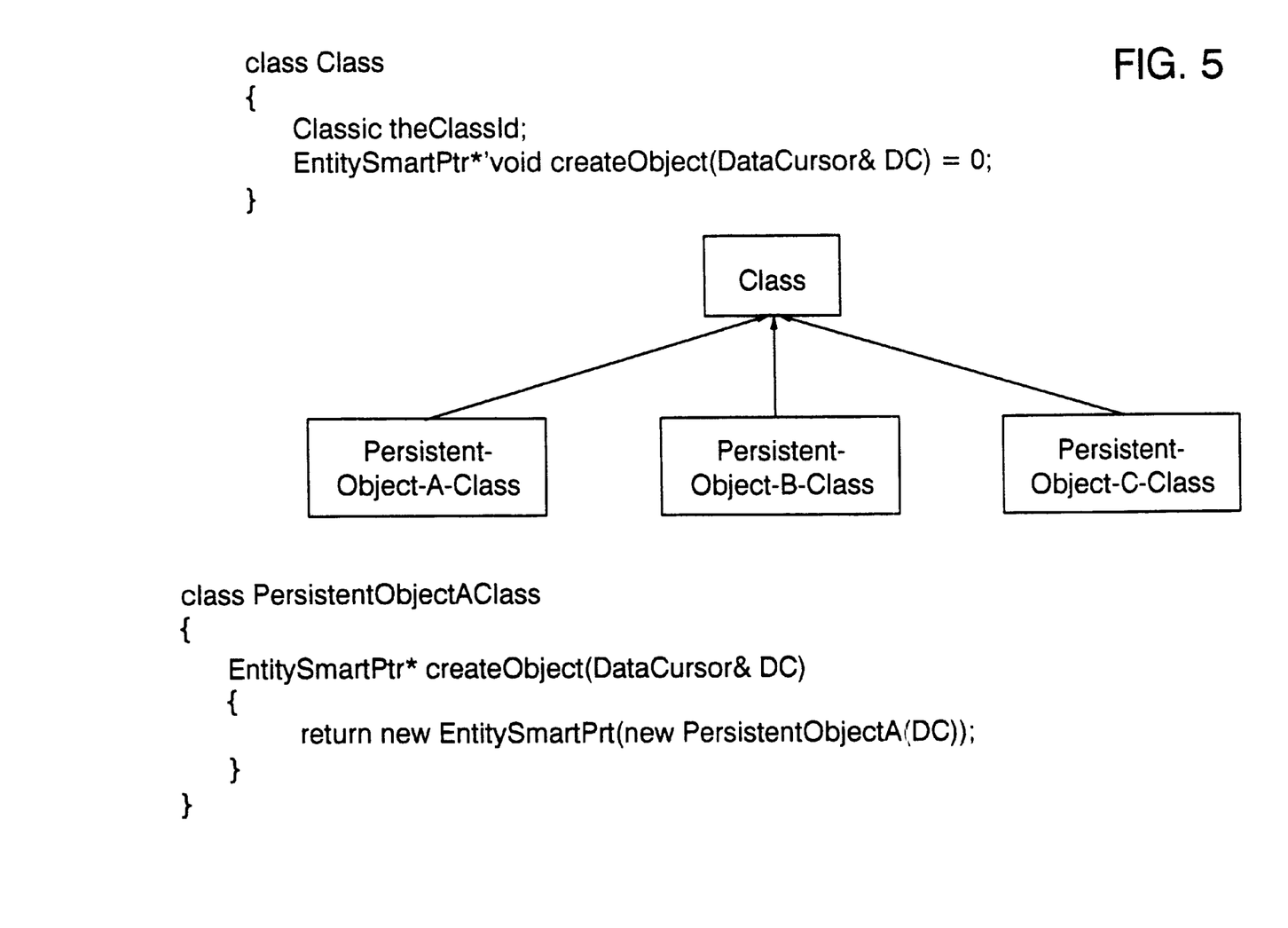
FIG. 5 The Class Object Class Hierarchy Exemplar.

FIG. 5 shows the class hierarchy for the Class objects. There is one Class class for each of the nonvolatile object classes; Persistent-Object-A Class, Persistent-Object-B Class, Persistent-Object-A Class. Each of these classes has a class identifier (usually an integer) that cannot change between object store versions. Each of these classes must also be able to create a new instance of its type and initialize the necessary data members from the Data Cursor.

Figure 6:
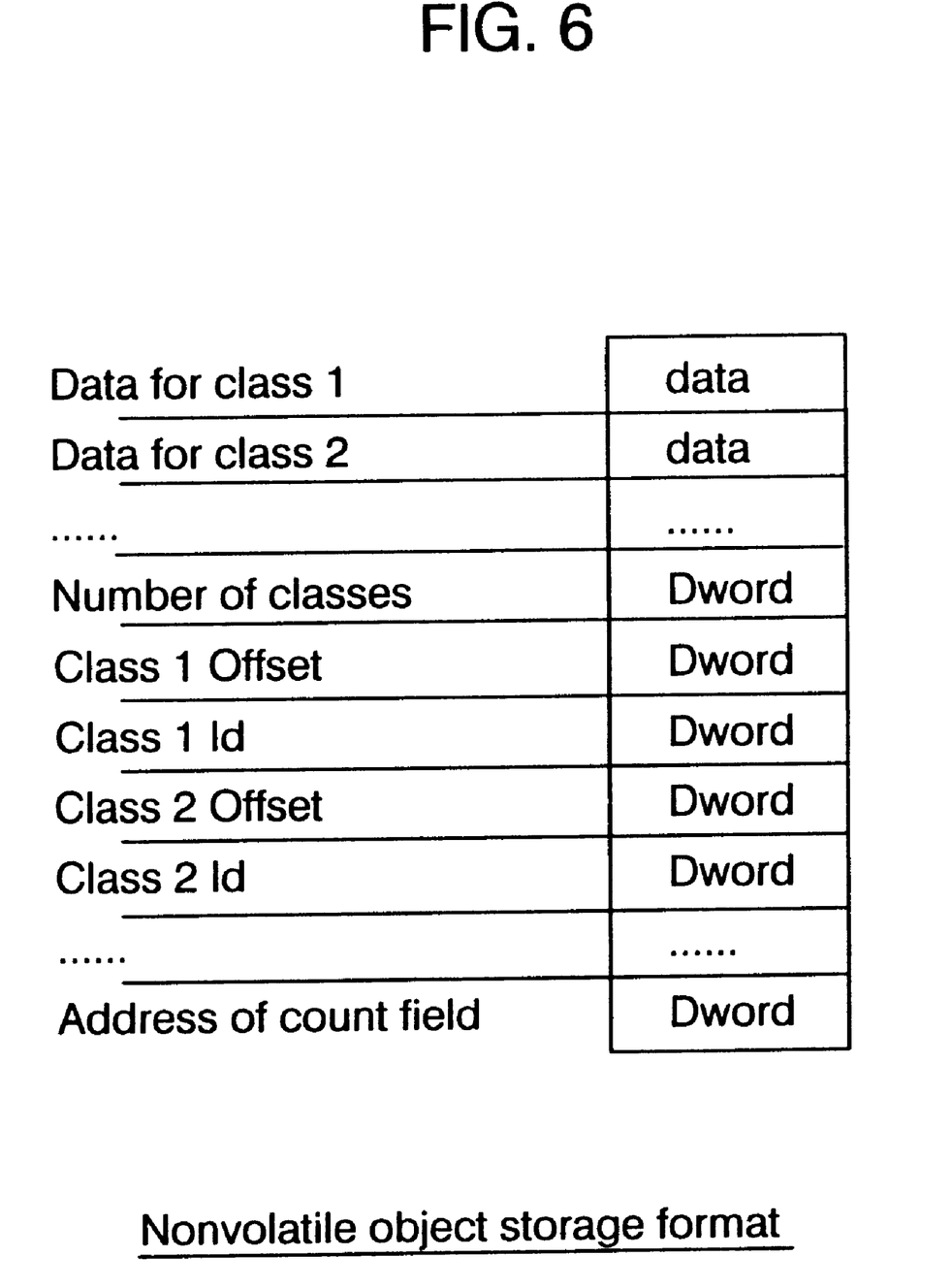
FIG. 6 Nonvolatile Object Storage Format.

The nonvolatile storage format of an object is shown in FIG. 6. The object is stored as a record comprising fields. The last field is the offset address of the "Number of classes" field in the data cursor's buffer. The number of classes is a count of the classes in the object's class hierarchy. For Example, Persistent-Object-A will have two classes, Persistent-Object-B will have two classes, and Persistent-Object-C will have three classes in their nonvolatile storage record.

Following the count of the classes in the record is first, the class offset address from the start of the data cursor's buffer, and second, the class identifier of the object at that offset. The object data is serially written from the start of the buffer.

Figure 7:
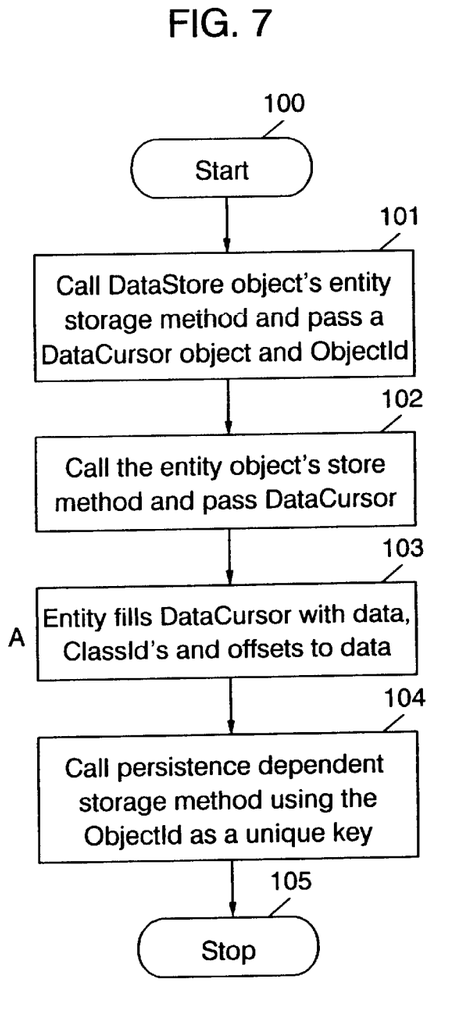
FIG. 7 Is the Logic Flow Chart for Permanent Storage.

FIG. 7 is a flowchart demonstrating "storing" objects on a flexible nonvolatile or persistence memory. As shown, the storage method is invoked 100, on a Data Store object that implements a particular type of nonvolatile storage. There can be any number of Data Store objects. A new DataCursor object and the object identity for the object to be stored are passed as parameters of this method 101. The data store then invokes the Storer method on the object to be stored 102. The next step 103 (designated by the letter "A") has the object (which is an entity) fill the DataCursor's buffer with class member data, class identifiers and class data offsets. Once we have a buffer of information representing the record of the object as shown in FIG. 6, the particular implementation of the data store saves it to permanent storage using the object identifier as the unique key 104. The process is then stopped 105.

Figure 8:
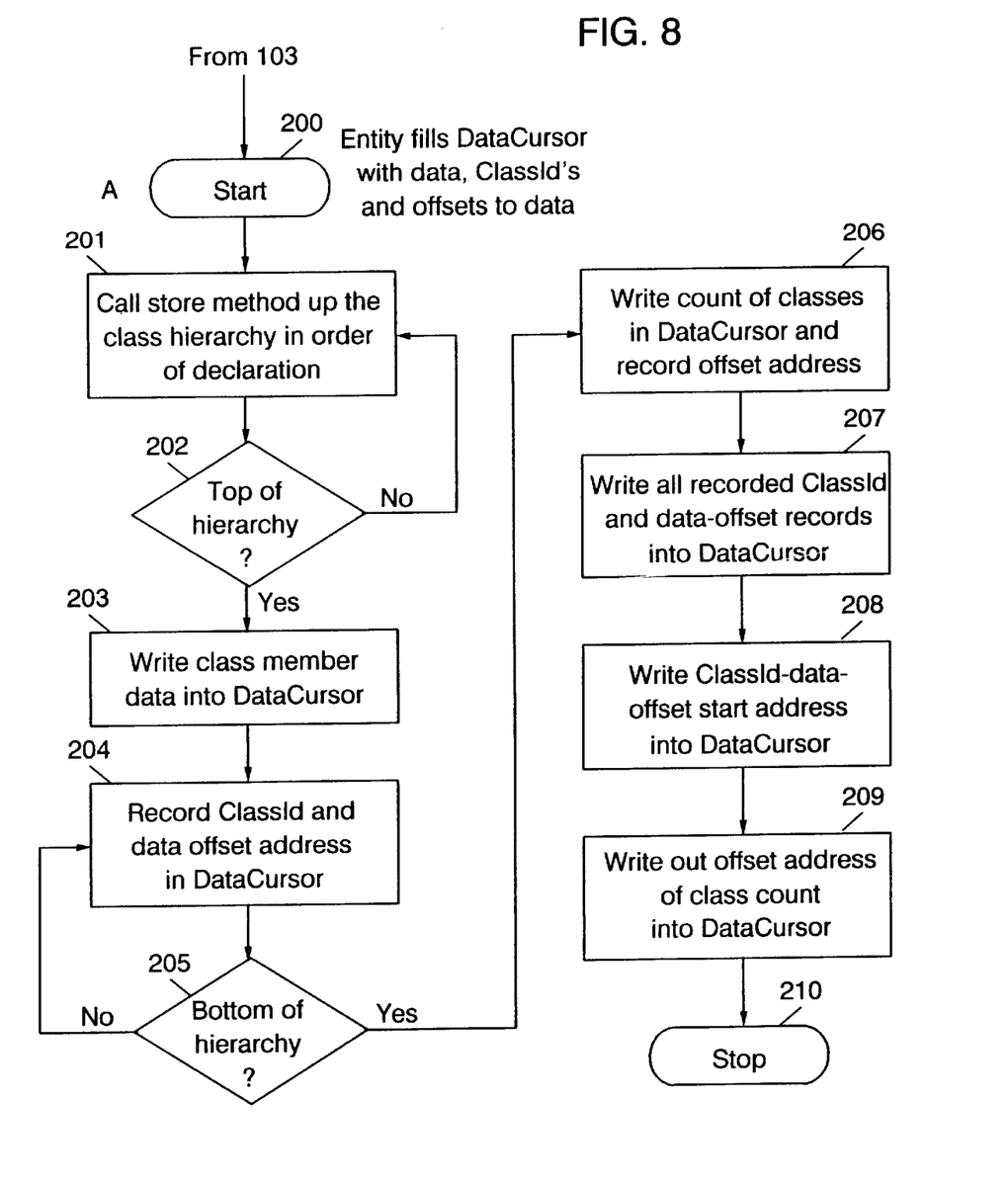
FIG. 8 Is the Process Flow Chart for filling the Data Cursor's Buffer with Data.

The process Flowchart for filling the data cursor's buffer with data, designated by the letter "A" at 103, is the shown in FIG. 8 at 200. When the store method is invoked, control is passed to the class of which the object (object to be stored) is an instance 201. If the object is not the top of the class hierarchy (it never is as all nonvolatile objects must be instances of classes that derive from the "Entity class") then the storage method on its super classes are invoked as noted by the query 202. This continues up the hierarchy in order in which the class hierarchy is declared. When we reach the top of the hierarchy 202, the member data for that class is written to the Data cursor object 203. The order of writing is the same as the order that members are declared in the class. The class ID and the offset address from the beginning of the buffer to the start of the class data is recorded for later use. This process continues until control is once again returned to the store method at the bottom of the hierarchy 205.

The number of classes 206 that have been written to the buffer is then inserted into the DataCursor buffer and the address from the beginning of the buffer to the start of this number is recorded for later use. The previously recorded ClassID and buffer address from the beginning of the buffer to the start of the class data is then written in the DataCursor Buffer 207. The final data written to the Data Cursor is the offset address 209 from the beginning of the DataCursor buffer to the count of the classes field in the buffer. The storage process is stopped and completed at 210.

Figure 9:
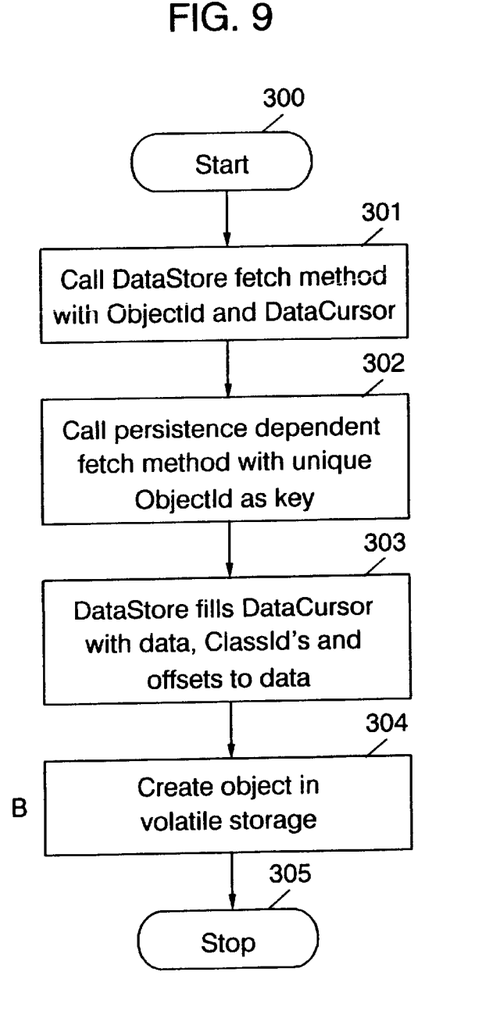
FIG. 9 Depicts the Retrieving of Objects Stored in Nonvolatile Storage.

Retrieving objects from the permanent storage system shown in Flowchart FIG. 9 depicts the retrieving of objects that are stored in the nonvolatile storage. FIG. 9 at 300 starts the process, when we have the identification of the object to be retrieved from non-volatile store. The DataStore for a particular permanent storage implementation is invoked with the object identifier and the data cursor. This in turn invokes the implementation dependent persistent manager's fetch method 302 and the block of data related to the object identifier key is retrieved 303 from the permanent store in a data cursor buffer. The step designated by the letter "B" is then performed where the object is created in the volatile store 304. The retrieval method is then completed and the process stops at 305.

Figure 10:
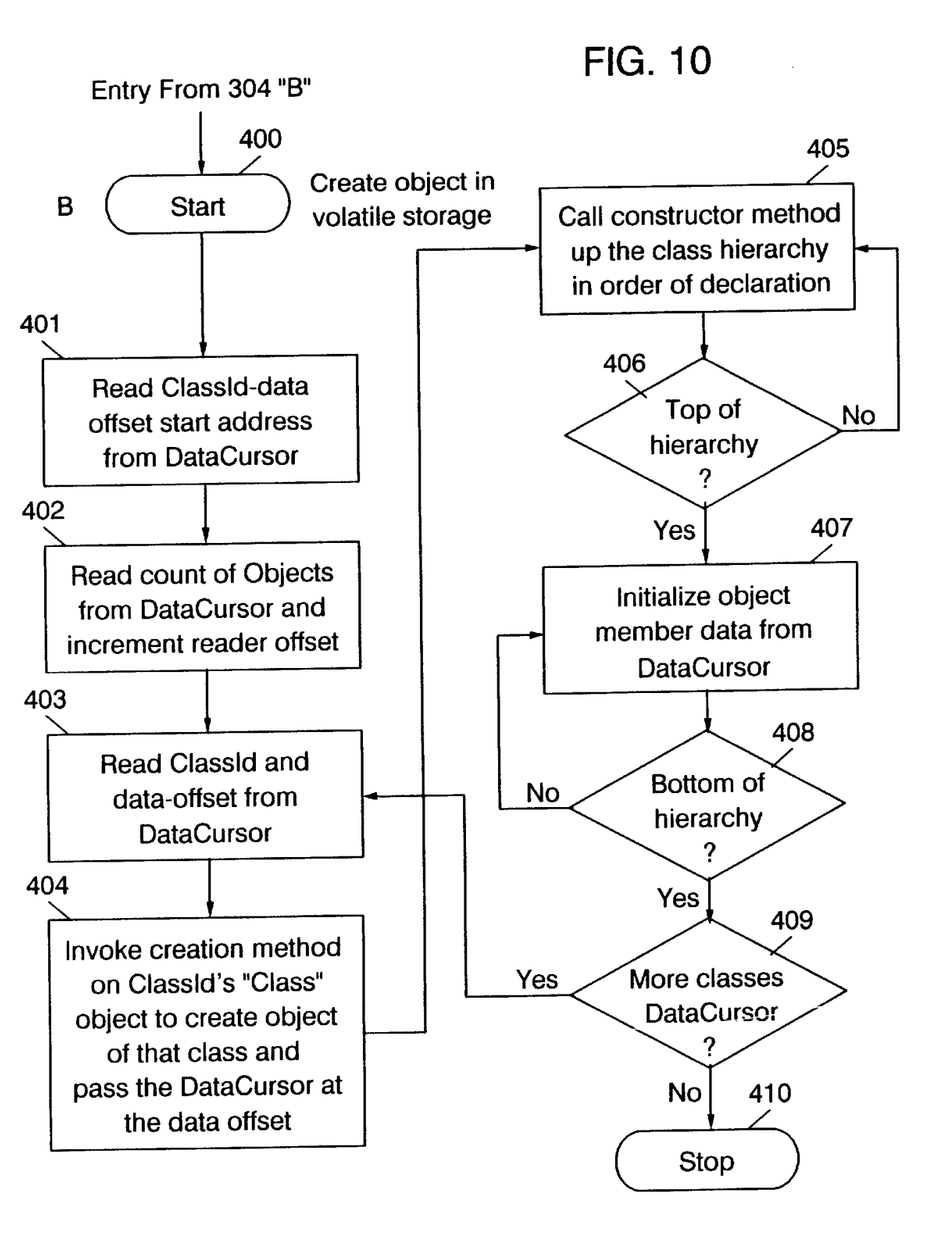
FIG. 10 Flowchart Depicts how the Framework Creates an Object in Volatile Storage.

Flowchart FIG. 10 at 400 shows how the framework creates an object in the volatile storage and is a direct sequence from FIG. 9 at 304 "B". The first step is to read the address of the class count field from the end of the buffer 401. This address is then used to read the count of the number of classes from the buffer. The buffer reader is then incremented to the first class offset address 402. For each of these classes, the system then reads the class data offset address 403 and the class identifier from the buffer. The class identifier is used to invoke the object creation method on the correct class object (e.g. Persistent-Object-A-Class). The class will create an instance of the class and pass the data cursor to the object's constructor 404. As when the system stored the object, it must call the constructor methods 405, up the hierarchy in the same order in which the object was saved. When the top of the hierarchy is reached 406, the query is raised as to whether object is at the top of the hierarchy, if no, then it is returned to 405.

If the answer to 406 is yes, we proceed to the class member data initialized 407. The constant and reference data is initialized by the class constructor. The process continues back down the hierarchy 408 and 409. When all of the classes have been recreated, the object will have been materialized in the volatile, non-permanent storage medium. The process of recreating the object in volatile storage is completed 410.

What is claimed is:

1. A method of storing an object in persistent storage comprising the steps of:
   a) having a persistence class, a data store class and a data cursor class;
   b) specifying a data cursor object, including an object ID, for an object to be stored in persistent storage;
   c) filling the data cursor object with data invoking a storer method of the object to be stored with the data cursor as argument, said data including class member data of the class of which the object to be stored is an instance;
   d) proceeding from said class of which the object to be stored is an instance to all super classes in the class hierarchy invoking the storer method for each super class in ascending sequence to add class member data from each super class into the data cursor object; and
   e) placing the filled data cursor object in permanent storage using the object ID as a unique key.

2. The method of claim 1 including the step of providing in the data cursor object the class ID and the data offset address for said class and each of said super class.

3. The method of claim 2 including the step of referencing the data cursor object in permanent store in a data cursor buffer to recreate the object in volatile store.

4. A computer program product on a computer useable medium which product stores an object in persistent store comprising:
   a) software code for providing a persistence class, a data store class and a data cursor class;
   b) software code for specifying a data cursor object, including an object ID, for an object to be stored in persistent storage;
   c) software code for filling the data cursor object with data invoking a storer method of the object to be stored with the data cursor as argument, said data including class member data of the class which the object to be stored is an instance;
   d) software code for proceeding from said class of which the object to be stored is an instance to all super classes in the class hierarchy in ascending sequence invoking the storer method for each of the super classes to add class member data from each super class into the data cursor; and
   e) software code for placing the filled data cursor object in permanent storage using the object ID as a unique key.

5. The product of claim 4 including software code for providing in the data cursor object the class ID and data offset address for said class and each of the super classes.

6. The product of claim 5 including software code for retrieving the data cursor object from permanent store in a data cursor buffer to recreate the object in volatile store.

7. A computer system which stores an object in persistent store comprising:
   a) means for providing a persistence class, a data store class and a data cursor class;
   b) means for specifying a data cursor object, including an object ID, for an object to be stored in persistent storage;
   c) means for filling the data cursor object with data by invoking a storer method of the object to be stored with the data cursor as argument, said data including class member data of the class which the object to be stored is an instance;
   d) means for proceeding from said class of which the object to be stored is an instance to all super classes in the class hierarchy invoking the storer method for each of the super classes in order up from said class of which the object to be stored is an instance, to add a class member data from each super class into the data cursor object; and
   e) means for placing the filled data cursor object in permanent storage using the object ID as a unique key.

8. The product of claim 7 including means for providing in the data cursor object, the class ID and data offset address for said class and each of the super classes.

9. The product of claim 8 including means for retrieving the data cursor object from permanent store in a data cursor buffer to recreate the object in volatile store.

* * * * *